Aug. 27, 1929.  C. SPARKS  1,726,166
INSERT PLUG
Filed April 14, 1926
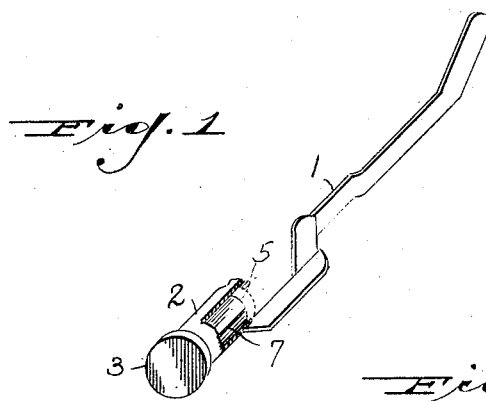
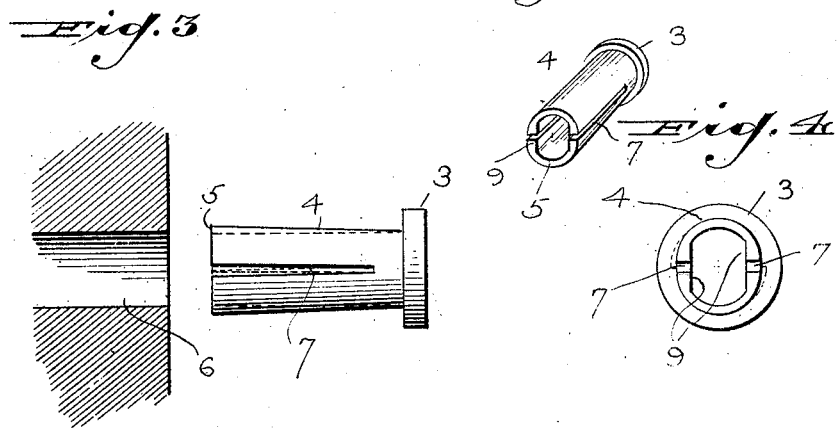
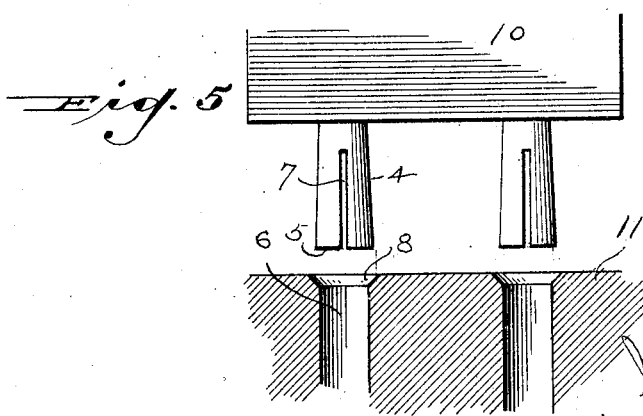
Inventor
Charles Sparks
By J. L. Walker
Attorney Patented Aug. 27, 1929.

1,726,166

UNITED STATES PATENT OFFICE.

CHARLES SPARKS, OF DAYTON, OHIO, ASSIGNOR TO THE KURZ-KASCH COMPANY, OF DAYTON, OHIO, A CORPORATION OF OHIO.

INSERT PLUG.

Application filed April 14, 1926. Serial No. 102,046.

My invention relates to non-metallic molded products and more particularly to an insert plug or stud of phenolic condensation material or the like, possessing an inherent tension or expansive tendency, by which the article may be detachably held in a receiving opening.

Phenolic condensation material is not ordinarily considered as a flexible or resilient substance. However, in the present invention, there is contemplated an expansible and contractible insert stud or plug of molded phenolic condensation material, fiber, hard rubber, composition or the like, which possesses sufficient inherent tension to enable its detachable detention within a receiving opening, by the inherent expansive tendency of the article. The insert stud or plug comprises a tubular body, the exterior of which is reversely tapered from its free end, i. e. the end first inserted in the receiving opening, which end is normally of greater diameter than the receiving opening, such body being longitudinally slotted from its larger end enabling contraction of the body, against the inherent tension of the material, to a substantially straight cylindrical form, from which contracted shape it is allowed to expand within the receiving opening. Such insert stud or plug may be provided with a head of any suitable shape, at its smaller end, toward which head the taper of the stud or plug converges, or such stud or plug may be attached at its smaller end to a supported body to be detachably engaged with a mounting by the insertion of the stud or plug into the receiving opening. Thus the invention may be embodied in closures or stoppers for openings, or it may be utilized as a coupling member for detachably connecting bodies or applied to other purposes, for which dowels or studs are ordinarily employed, particularly if such dowels or studs are intended to be removable or interchangeable.

The object of the invention is to improve the construction as well as the means and mode of operation of detachable studs, plugs, dowels or the like, whereby they will not only be cheapened in construction, but will be more efficient in use, capable of being readily and quickly applied, enabled to detachably retain their engagement by the inherent tension of the article, and unlikely to get out of repair.

A further object of the invention is to provide a non-metallic molded insert stud or plug possessing an inherent resiliency, and particularly one formed from phenolic condensation material or the like.

With the above primary and other incidental objects in view as will more fully appear in the specification, the invention consists of features of construction, of parts and combinations thereof, and the mode of operation or their equivalents as hereinafter described and set forth in the claims.

Referring to the drawings, wherein is shown the preferred, but obviously, not necessarily the only form of embodiment of the invention, Fig. 1 is a perspective view showing the insert plug or stud forming the subject matter hereof applied to a telephone jack sleeve. Fig. 2 is a perspective view of a dummy phone jack plug embodying the present invention. Fig. 3 is an enlarged side elevation and Fig. 4 an enlarged end elevation of the plug or insert stud forming the subject matter hereof. Fig. 5 shows the plug or insert stud projecting from a supported body for detachably coupling such body with a suitable mounting, having sockets or holes therein to receive the resilient stud.

Like parts are indicated by similar characters of reference throughout the several views.

While the present invention is applicable to a number of uses, for illustrative purposes, it has been shown applied to a telephone switch board dummy plug. Heretofore the popular form of telephone dummy plug has been a closure head having projecting therefrom, metallic spaced fingers or tines which extend within the sleeve of the jack. The telephone jack sleeves after long periods of use become interiorly worn out of their original circular form or worn into grooves by the frequent insertion and removal of the telephone jack plug. The spring fingers or tines of the usual form of dummy plug which contact the interior of the sleeve only at diametrically opposite points, tend to find the low places or grooves of the jack sleeve and so fail to hold tightly. The present form of resilient plug or stud is especially adapted to this purpose, inasmuch as it engages the telephone jack sleeve throughout substantially the entire inner circumferential surface, and does not tend to become localized in the worn grooves or low places in the sleeve.

Referring to the drawing, 1 is a typical form of telephone jack bar, having at its forward end the sleeve 2. In Fig. 1 the sleeve has been shown broken away at one side to expose within, the inner end of the dummy plug. The dummy plug comprises a head portion 3 from which projects a tubular body portion 4 of tapered form, converging toward the head 3. The larger or free end 5 of this plug or stud is of somewhat greater diameter than the interior bore of the jack sleeve 2, or the bore of the receiving opening or pocket shown in Figs. 3 and 5. The tapered body of the plug is longitudinally slotted, at diametrically opposite points as indicated at 7. This enables the enlarged free end of the plug or insert to be compressed to a substantially straight cylindrical form as shown by dotted lines in Fig. 3. When so compressed, the free end of the plug or insert may be entered within the jack sleeve 2, or within the socket 6. To enable the automatic compression of the plug as it is being thrust into the socket, the orifice of such receiving opening or socket 6 may be chamfered or beveled as at 8 in Fig. 5. Being placed under compression or tension in order to be entered within the receiving opening 6 or within the sleeve 2 of the phone jack, the plug or insert expands within such receiving opening, thus frictionally engaging the walls of the opening or socket under pressure or inherent tension of the insert. In order that the slotted end of the insert may not be pressed or twisted askew, so that the margins of the slots 7 are forced out of registry or into overlapping relation as shown by dotted lines in Fig. 4, the side walls of the tubular body 4 are made of increased thickness adjacent to the slot 7, as shown at 9 in Figs. 2 and 4. By thus increasing the thickness of the wall at such slotted point, when fully compressed the margins of the slot 7 will retain their contact one upon the other, even though pressed laterally out of exact registry. In Fig. 5, two of such insert studs or plugs have been shown attached to a supported body 10, for purpose of detachably coupling the body 10 with a suitable mounting 11, having therein, the receiving openings 6.

It has been found that by molding the insert stud or plug of tubular form, and providing the slot 7 of sufficient width to compensate for the degree of taper of the body, and enable its compression to straight cylindrical form, the ordinary commercial composition of phenolic condensation material will yield sufficiently within the limits prescribed by the slot 7 to enable its insertion within the receiving opening, and will thereupon expand therein due to the inherent resiliency of the material. While there is a very large field for the present invention as a dummy phone plug, because of its dielectric character, and its ability to retain its position in badly worn and enlarged jack sleeves, as well as to contract to closely fitting engagement in new jacks, the sleeves of which are the original exact size, it is to be understood that the invention is not limited to this field alone, but may be applied to other analogous purposes. By being molded from phenolic condensation materials, the plugs or inserts may be made of different colors for signal or indicator purposes, or the heads 3 may be variously shaped or ornamented. The slot 7 is preferably only sufficiently wide to provide for the maximum compression necessary to enable the insertion of the stud or plug within the receiving opening. This tends to eliminate breakage when springing the halves of the tubular body 4 together. The thickening of the slotted portions of the walls is of material advantage in preventing the resilient halves of the body being pressed one past the other, into overlapping relation and thus tend to limit the compression to the width of the slot 7, and insures against undue compression and breakage.

From the above description, it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute, the invention has been described in language more or less specific as to structural features, it is to be understood that the invention is not limited to the specific details shown, but that the means and construction herein disclosed comprise the preferred form of several modes of putting the invention into effect and the invention is, therefore, claimed in any of its forms or modifications within the legitimate and valid scope of the appended claims.

Having thus described my invention, I claim:

1. A molded insert stud of phenolic condensation material or the like, comprising a tubular body longitudinally slotted and possessing a degree of inherent resiliency permitting the slotted portion to be contracted to enable its introduction into an opening of less diameter than the normal diameter of such slotted portion within which the insert is detachably engaged by its inherent expansive tendency, the walls of the tubular body contiguous to the longitudinal slots being of increased thickness.

2. A molded insert stud of phenolic condensation material or the like, comprising a tapered hollow body longitudinally slotted from its larger end, the margins of the wall adjacent to the slot being of increased thickness.

3. An insert stud comprising a hollow tubular tapered body longitudinally slotted from its larger end, the walls of the body contiguous to the slot being of increased thickness, said slotted tapered body possessing a degree of inherent resiliency sufficient to permit the contraction of the enlarged slotted end of the body to enable its introduction into an opening of less diameter than the normal diameter of such slotted end.

In testimony whereof, I have hereunto set my hand this 29th day of March A. D. 1926.

CHARLES SPARKS.